United States Patent
Cross, Jr. et al.

(10) Patent No.: US 10,498,726 B2
(45) Date of Patent: Dec. 3, 2019

(54) CONTAINER INDEPENDENT SECURE FILE SYSTEM FOR SECURITY APPLICATION CONTAINERS

(71) Applicant: International Business Machines Corporation, Armonk, NY (US)

(72) Inventors: Charles W. Cross, Jr., Wellington, FL (US); Victor S. Moore, Gainesville, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/076,883

(22) Filed: Mar. 22, 2016

(65) Prior Publication Data

US 2017/0279797 A1    Sep. 28, 2017

(51) Int. Cl.
*H04L 29/06* (2006.01)
*G06F 21/62* (2013.01)
*G06F 9/455* (2018.01)

(52) U.S. Cl.
CPC .......... *H04L 63/0853* (2013.01); *G06F 21/62* (2013.01); *H04L 63/0435* (2013.01);
(Continued)

(58) Field of Classification Search
CPC . H04L 63/0853; H04L 63/083; H04L 63/061; H04L 41/5041; H04L 41/0803; H04L 47/785; H04L 63/1466; H04L 67/1031; H04L 63/10; H04L 63/0428; H04L 9/0816; H04L 63/0823; H04L 67/08; H04W 4/003; G06F 21/53; G06F 21/602; G06F 21/57; G06F 21/33; G06F 21/629; G06F 21/34; G06F 2009/45587; G06F 9/4445; G06F 13/10; G06F 9/45558; G06F 17/30; G06F 3/06; G06F 2009/45579; G06F 9/45537; G06F 13/385; G06F 2213/3802; G06F 2213/0058

See application file for complete search history.

(56) References Cited

U.S. PATENT DOCUMENTS 7,987,497 B1    7/2011    Giles et al.
8,099,758 B2 *  1/2012    Schaefer ........... G06F 17/30082
                                                       726/1
(Continued)

OTHER PUBLICATIONS

Docker, "Understand Docker Container Networks", https://docs.dockercom/engine/userguide/networking/dockernetworks/ Mar. 2013.
(Continued)

*Primary Examiner* — Ali S Abyaneh
*Assistant Examiner* — Shu Chun Gao
(74) *Attorney, Agent, or Firm* — Cantor Colburn LLP; Nicholas Bowman

(57) ABSTRACT

Embodiments include method, systems and computer program products for a container independent secure file system for security application containers. In some embodiments, a request for a virtualized application container may be received. A passphrase may be obtained from a user. A key may be obtained. A files system of the virtualized application container may be prepared for a specified mount point using the passphrase and key. The file system may be initiated in response to the request.

13 Claims, 4 Drawing Sheets

(52) U.S. Cl.
CPC .......... *G06F 9/455* (2013.01); *G06F 21/6209* (2013.01); *H04L 63/061* (2013.01); *H04L 63/083* (2013.01)

(56) References Cited

U.S. PATENT DOCUMENTS

| | | | | |
|---|---|---|---|---|
| 8,335,915 B2* | 12/2012 | Plotkin | .................. | G06F 21/85 380/277 |
| 8,930,568 B1 | 1/2015 | Chalmer et al. | | |
| 8,949,929 B2* | 2/2015 | Kelly | .................. | G06F 21/53 455/410 |
| 8,959,312 B2* | 2/2015 | Acharya | .................. | G06F 3/0605 711/203 |
| 8,966,581 B1* | 2/2015 | Gross | .................. | G06F 21/33 726/2 |
| 8,977,842 B1* | 3/2015 | McCorkendale | .................. | G06F 21/53 380/285 |
| 9,037,621 B2* | 5/2015 | Hutchins | .................. | G06F 16/16 707/829 |
| 9,225,527 B1 | 12/2015 | Chang | | |
| 9,275,083 B2* | 3/2016 | Thakur | .................. | G06F 16/122 |
| 9,489,510 B1* | 11/2016 | Scott | .................. | G06F 21/45 |
| 9,568,974 B2* | 2/2017 | Khuti | .................. | G06F 1/206 |
| 9,613,190 B2* | 4/2017 | Ford | .................. | G06F 21/10 |
| 9,626,166 B1 | 4/2017 | Alewine | | |
| 10,015,172 B2* | 7/2018 | McMichael, IV | .... | H04L 63/102 |
| 2011/0061045 A1* | 3/2011 | Phillips | .................. | G06F 9/45541 717/173 |
| 2012/0023558 A1* | 1/2012 | Rafiq | .................. | H04L 63/08 726/6 |
| 2012/0054486 A1* | 3/2012 | Lakkavalli | .................. | G06F 21/57 713/156 |
| 2012/0096071 A1* | 4/2012 | Murphey | .................. | G06F 8/63 709/203 |
| 2012/0110328 A1* | 5/2012 | Pate | .................. | G06F 21/6218 713/165 |
| 2012/0266231 A1* | 10/2012 | Spiers | .................. | H04L 63/0218 726/12 |
| 2013/0305039 A1* | 11/2013 | Gauda | .................. | G06F 21/6218 713/153 |
| 2014/0135042 A1* | 5/2014 | Buchheim | .................. | G01S 1/68 455/456.6 |
| 2015/0356105 A1* | 12/2015 | Knutson | .................. | G06F 16/13 707/624 |
| 2016/0014196 A1* | 1/2016 | Azulay | .................. | G06F 21/31 726/3 |
| 2016/0381031 A1* | 12/2016 | McMichael, IV | .... | H04L 63/102 726/6 |
| 2017/0041296 A1* | 2/2017 | Ford | .................. | H04L 63/0421 |
| 2017/0264684 A1* | 9/2017 | Spillane | .................. | H04L 67/1095 |
| 2018/0367506 A1* | 12/2018 | Ford | .................. | H04W 12/06 |

OTHER PUBLICATIONS

List of IBM Patents or Patent Applications Treated as Related; Date Filed: Apr. 10, 2018, 2 pages.

* cited by examiner

CONTAINER INDEPENDENT SECURE FILE SYSTEM FOR SECURITY APPLICATION CONTAINERS

BACKGROUND

The present disclosure relates to methods, systems and computer program products for a container independent secure file system for security application containers.

Operating-system-level virtualization (also known as containers, software containers, virtualization engines, virtual private servers, or the like) is a server-virtualization method where the kernel of an operating system allows for multiple isolated user-space instances, instead of just one. The isolated user-space instances may look and feel like a real server from the point of view of its owners and users.

Applications or container systems may be used for the deployment of applications inside software containers, by providing an additional layer of abstraction and automation of operating-system-level virtualization. Some applications may use the resource isolation features of the kernel such as cgroups and kernel namespaces, and a union-capable filesystem such as aufs and others to allow independent "containers" to run within a single instance, avoiding the overhead of starting and maintaining virtual machines.

However, such container systems suffer from a lack of security. In particular, the contents of the containers may be visible in the host file system to the system administrator or a root user. Security applications need to protect customer data like cryptographic keys from any user that is not specifically granted access in the security application.

SUMMARY

In accordance with an embodiment, a method for a container independent file system for security application containers is provided. The method may include receiving a request for a virtualized application container; obtaining a passphrase from a user; obtaining a key; preparing a file system of the virtualized application container for a specified mount point using the passphrase and the key; and initiating the file system in response to the request.

In another embodiment, a computer program product may comprise a non-transitory storage medium readable by a processing circuit and storing instructions for execution by the processing circuit for performing a method that may include receiving a request for a virtualized application container; obtaining a passphrase from a user; obtaining a key; preparing a file system of the virtualized application container for a specified mount point using the passphrase and the key; and initiating the file system in response to the request.

In another embodiment, a system for optimizing persistency using hybrid memory may include a processor in communication with one or more types of memory. The processor may be configured to receive a request for a virtualized application container; obtain a passphrase from a user; obtain a key; prepare a file system of the virtualized application container for a specified mount point using the passphrase and the key; and initiate the file system in response to the request.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for a container independent secure file system for security application containers. In some embodiments, to adapt a security appliance to run in a container instance with portions of its file system secured with two-factor encryption, a container system plugin may be used to provide custom file systems to the container instance at run time. For example, when a secure volume plugin is invoked by a container system, it may obtain a passphrase from a user. In some embodiments, the secure volume plugin may obtain a passphrase from a key management system. For example, a user may establish or set up a relationship between a host machine and a key management system to establish the host machine as a "trusted host" that can subsequently securely obtain the key from the key management system without user interaction. In some embodiments, security standards such as Key Management Interoperability Protocol (KMIP) may be utilized. In some embodiments, the secure volume plugin may also obtain a key from a secure element of a device associated with the container system. The secure volume plugin may prepare the file system of a container instance for a specified mount point with the user provided passphrase and obtained key (e.g., used for the two-factor encryption). Different approaches that may be implemented, depending on the system requirements. For example, the secure volume plugin may prepare a secure file system for an encrypted virtual disk image (e.g., encrypted using disk encryption specification, such as Linux Unified Key Setup (LUKS)) or an encrypted directory using a file system encryption technique (e.g., Enterprise Cryptographic (eCryptfs)). The container system may execute a command that initiates the container instance with specified mount points and volume plugins using its layered file system. An application of the container management system may access artifacts in the encrypted file system as plaintext files from within the container, not knowing that the underlying file systems are secured by encryption. Thus, the application does not have to implement any cryptologic.

By implementing a secure volume plugin, in a way that is independent of the container instance itself, IT system administrators may have a security tool that can be deployed across a wide variety of third party containerized applications or appliances.

Figure 1:
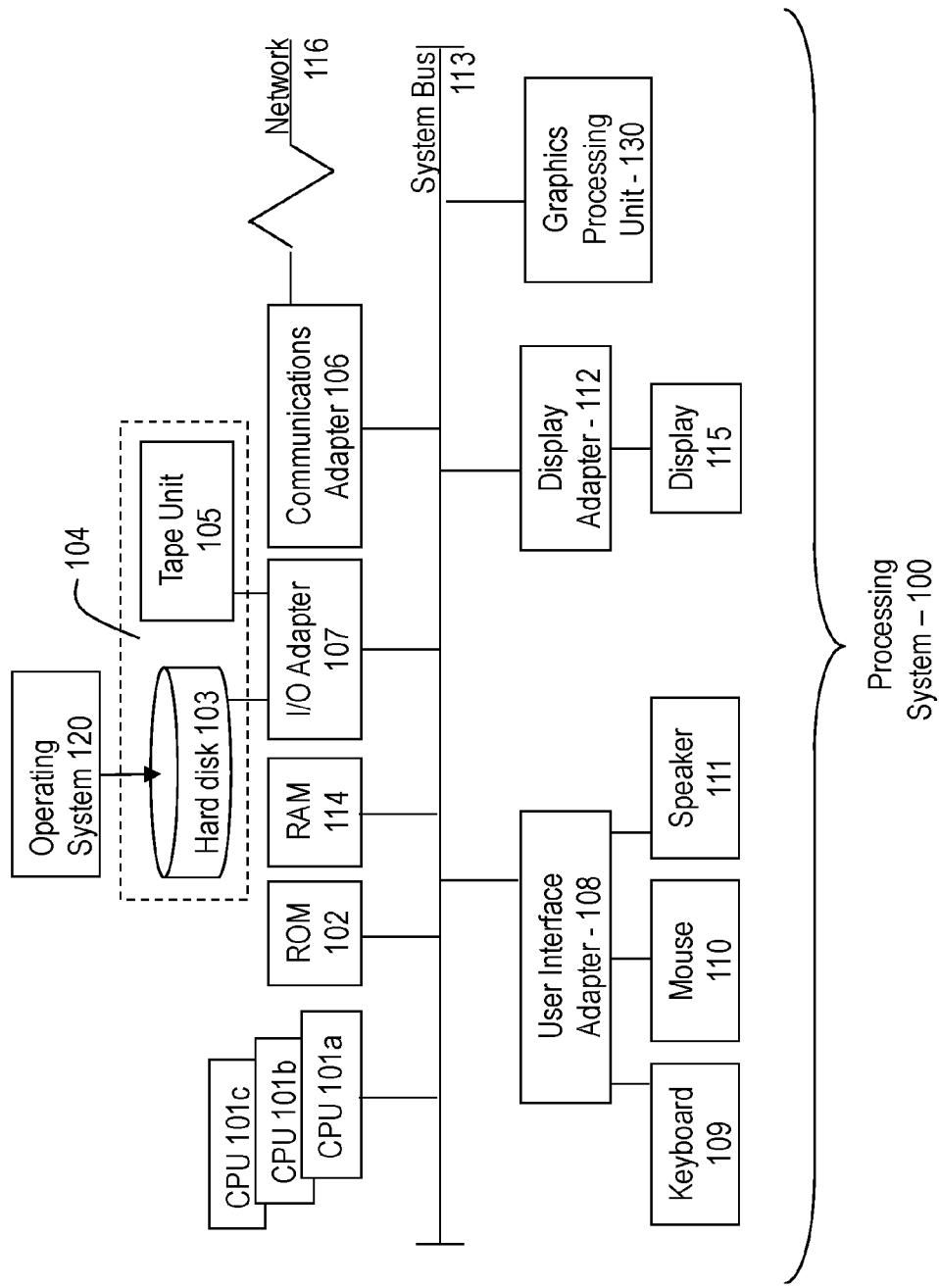
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the Linux® operating system from IBM Corporation to coordinate the functions of the various components shown in FIG. 1.

Figure 2:
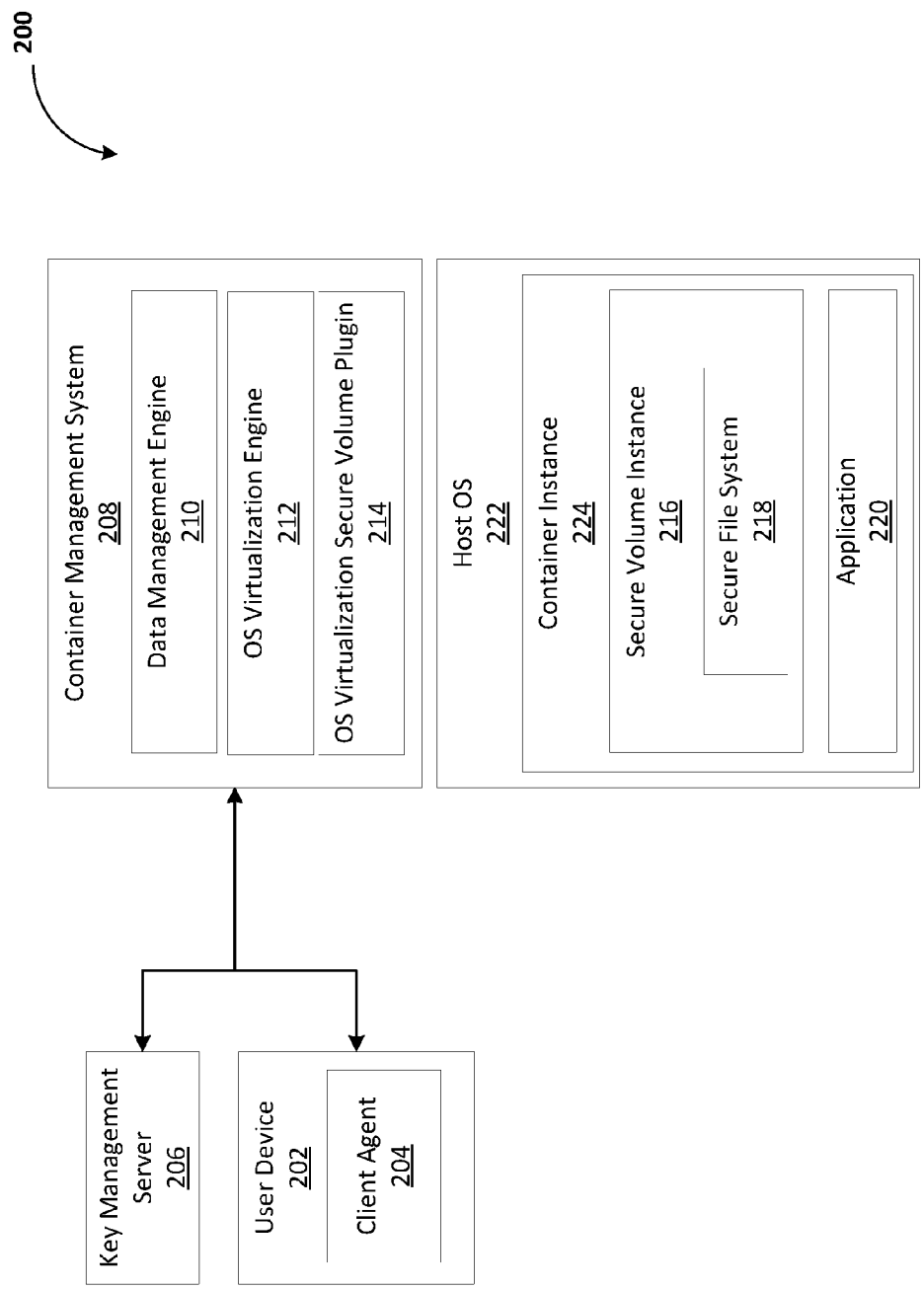
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a user device 202, a key management server 206, a container management system 208, and a host OS 222 that may be executing one or more container instances 224. In some embodiments, the user device may include a client agent 204. In some embodiments, the container management system 208 may include a data engine 210, an OS virtualization engine 212, and an OS virtualization secure volume plugin 214. A host OS 222 may execute one or more container instances 224 which may include one or more secure volume instances 216, and one or more applications 220.

In some embodiments, the user device 202 may be any type of user device, which may include smartphones, tablets, laptops, desktop, server, and the like. A user device 202 may include a client agent 204. The client agent 204 may include computer-readable instructions that in response to execution by the processor(s) 101 cause operations to be performed including presenting an interface to a user and receiving information from a user. The client agent 204 may receive an indication from a user for a virtualized application container. In some embodiments, the client agent 204 may generate a request for the virtualized application container and transmit the request to a container management system 208. In some embodiments, the client agent 204 may communicate with a key management server 206 to obtain a universally unique identifier corresponding to a passphrase provided by the user via the client agent 204. In some embodiments, the request to the container management system 208 may include the UUID, which may be used to encrypt a file system of a secure volume instance 216.

In some embodiments, the system may include a key management server 206. The key management server 206 may generate and maintain UUIDs and any associations to passphrases requested by users. In some embodiments, the container management system 208 (e.g., data management engine 210) may communicate with the key management server 206 to obtain the passphrase corresponding to the UUID to use in encrypting the file system 218 of the secure volume. In some embodiments, a customer may store a passphrase associated with the secure file system 218 in a key management server 206 and may receive a unique identifier (UUID) for retrieval by the container management system 208 at runtime.

In some embodiments, the key management server 206 may store a random key to be used for encryption of a file system 218 of a secure volume instance 216. The container management system 208 may transmit a UUID associated with a user of a user device 202 to the key management server 206 to obtain the random key that may be used by the OS virtualization secure volume plugin 214 to encrypt the secure file system 218.

In some embodiments, the container management system 208 may be any type of computing device, which may include a laptop, desktop, server, and the like. A container management system 208 may include a data management engine 210, an OS virtualization engine 212, and an OS virtualization secure volume plugin 214 The data management engine 210 may include computer-readable instructions that in response to execution by the processor(s) 101 cause operations to be performed including communicating with a user device 202 and/or key management server 206, transmitting and obtaining data (e.g., passphrases, keys, user data, etc.), managing the obtained data, providing data upon request by one or more components of the system 200, and updating/maintaining the data.

The OS virtualization engine 212 may include computer-readable instructions that in response to execution by the processor(s) 101 cause operations to be performed including automated deployment of applications inside software containers, by providing an additional layer of abstraction and automation of operating-system-level virtualization. The OS virtualization engine 212 may use the resource isolation features of the kernel such as cgroups and kernel namespaces, and a union-capable filesystem such as aufs and others to allow independent "containers" to run within a single instance, avoiding the overhead of starting and maintaining virtual machines. The OS virtualization engine 212 may receive the request for a virtualized application container from the data management engine 210 and may initiate the OS virtualization secure volume plugin 214.

The OS virtualization secure volume plugin 214 may include computer-readable instructions that in response to execution by the processor(s) 101 cause operations to be performed including encrypting the file system 218 of an identified secure volume instance 216 of a container instance 224. In some embodiments, the OS virtualization secure volume plugin 214 may utilize two-factor encryption for the secure file system 218. In some embodiments, the two-factor encryption may be done using a passphrase provided by the user of the user device 202 and a key obtained from a key management server 206 and/or a secure element.

In some embodiments, the system 200 may include a host OS 222 which may instantiate and execute one or more container instances 224. The container instances 224 may include one or more secure volume instances 216 and one or more applications 220.

The host OS 222 may include computer-readable instructions that in response to execution by the processor(s) 101 cause operations to be performed including executing the one or more container instances 224. The container instances 224 may be isolated from each other, which may prevent communication between the different container instances 224. However, the container instances 224 may be executed on the host OS 222 of a container management system 208.

The application 220 may include computer-readable instructions that in response to execution by the processor(s) 101 cause operations to be performed including functionality specific to the application, such as data management, processing, communication, etc. The application 220 may access artifacts in a secure file system 218 of a secure volume instance 216 within a container instance 224.

Figure 3:
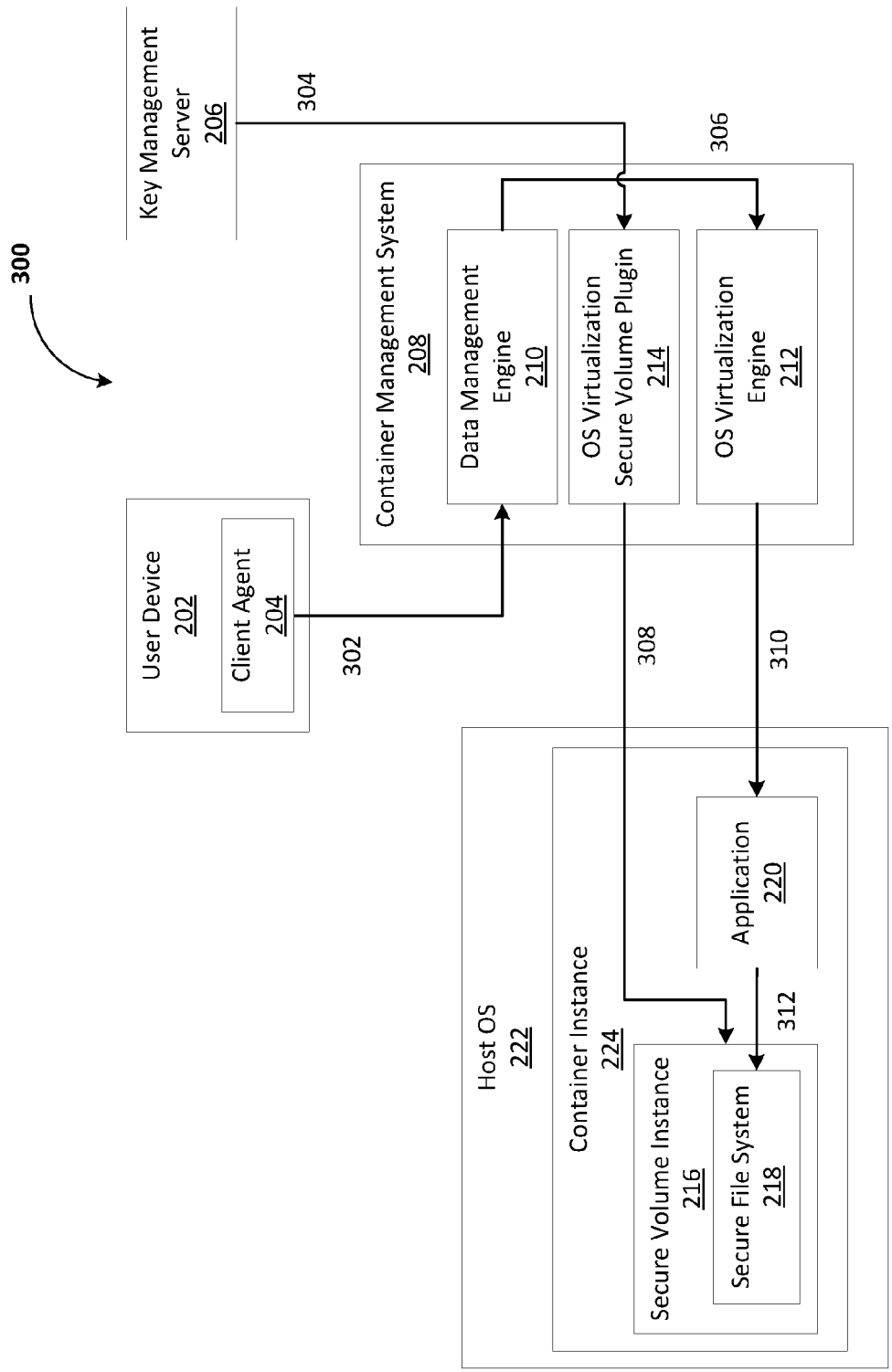
FIG. 3 is a block diagram illustrating data flow through a computing system in accordance with an exemplary embodiment.

FIG. 3 is a block diagram illustrating data flow 300 through a computing system in accordance with an exemplary embodiment.

At exchange 302, the client agent 204 of a user device 202, may generate and transmit a request for a virtualized application container instance 224. The data management engine 210 may receive and process the request. The request may be transmitted to the OS virtualization engine 212 from the data management engine 210. The OS virtualization engine 212 may invoke the OS virtualization secure volume plugin 214. At exchange 304, the OS virtualization secure volume plugin 214 may receive a random key from the key management server 206 in response to the request transmitted. The random key may have been obtained by the key management server 206 using the UUID provided by the data management engine 210. The OS virtualization secure volume plugin 214 may obtain a random key for the container instance 224 from the key management server 206. In some embodiments, the OS virtualization secure volume plugin 214 may transmit a request to the key management server 206 to obtain a random key. The request may include a unique universal identifier (UUID) associated with the user device 202 or user. The direct communication between the OS virtualization secure volume plugin 214 and the key management server 206 may indicate that the container management system 208 is unaware of the implementation details of the OS virtualization secure volume plugin 214 and merely invokes the OS virtualization secure volume plugin 214 in response to a request from the client agent 204 and passes the resulting secure volume instance 216 to the container instance 224 that is also requested in response to the request form the client agent 204.

At exchange 306, the data management engine 210 may transmit the passphrase obtained from a user of the user device 202 to the OS virtualization secure volume plugin 214.

In an alternative embodiment, the data management engine 210 may transmit instructions to access a secure element (e.g., a separate, secure processor independent of the general processor utilized by the host OS 222, such as a hardware security module). In some embodiments, the data management engine 210 may access or track multiple secure elements and provide instructions to access a specific secure element based on the user's security privileges.

At data exchange 308, the OS virtualization secure volume plugin 214 may use the passphrase and the key to prepare the file system for the specified mount point. In some embodiments, the OS virtualization secure volume plugin 214 may apply a two-factor encryption technique to generate a secure file system 218 in the secure volume instance 216 using the passphrase and the key.

At data exchange 310, the OS virtualization engine 212 may execute a command to initialize the container instance 224 that includes the secure volume instance 216 at a specified mount point (e.g., application 220) and using volume plugins.

At data exchange 312, the application 220 may access artifacts in the secure file system 218 of the container instance 224. In some embodiments, the artifacts may be accessed as plaintext files from within the container instance 224 without knowledge that the underlying file system is secured by encryption.

Figure 4:
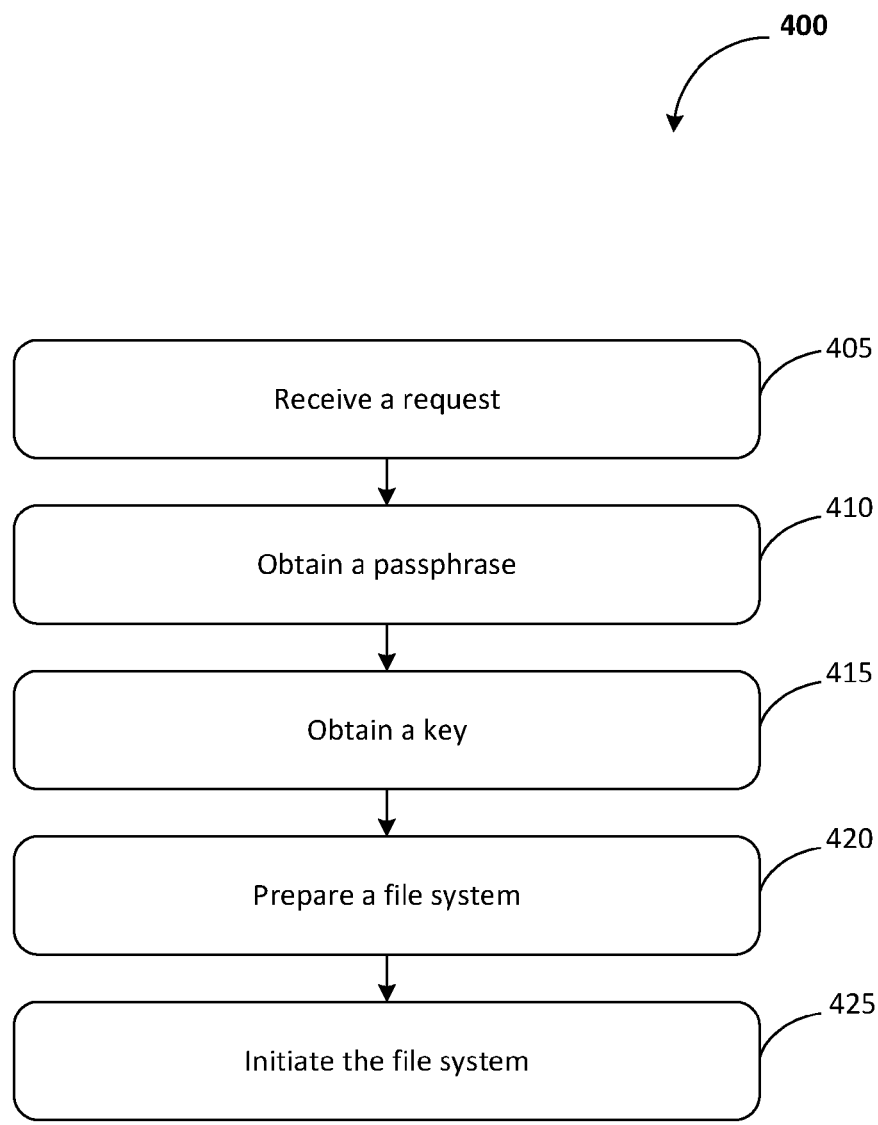
FIG. 4 is a flow diagram of a method for a container independent secure file system for security application containers in accordance with an exemplary embodiment.

Now referring to FIG. 4, a flow diagram of a method 400 for a container independent secure file system for security application containers in accordance with an exemplary embodiment is shown.

At block 405, a request may be received. In some embodiments, a data management engine 210 may receive a request from a user device 202. The request may be a request for a virtualized application container instance 224. The data management engine 210 process the request and may transmit a notification or message to an OS virtualization secure volume plugin 214.

At block 410, a passphrase may be obtained. In some embodiments, the passphrase may be received in the request from the user device 202 (e.g., at block 405). In some embodiments, the data management engine 210 may initiate a request to the user device 202 to obtain the passphrase (e.g., facilitate presentation of a user interface to obtain the passphrase, request a passphrase from an application executing on the user device 202, such as a password management application, or the like). The data management engine 210 may obtain the passphrase and may transmit the passphrase to the OS virtualization secure volume plugin 214.

At block 415, a key may be obtained. In some embodiments, the data management engine 210 may obtain a key from a key management server 206 based at least in part on data in the request received at block 405. In some embodiments, the data management engine 210 may obtain a key from the key management server 206 using data either associated with a user of the user device 202 or data provided by a user of the user device 202. For example, a key may be obtained from key management server 206 using a unique universal identifier (UUID) associated with the user of the user device 202 or the request for a virtualized application container. The data management engine 210 may transmit a request to the key management server 206, where the request includes a UUID. The key management server 206 may transmit a response to the request, where the response contains a key associated with the UUID.

In some embodiments, a key may be stored on a secure element (e.g., a specialized processor, separate from the CPU of a host device of the container management system 208). For example, a key may be stored on a hardware security module. In some embodiments, the host device of the container management system 208 may have a secure element for different companies (e.g., users associated with company A may have access to secure element A, whereas users associated with company B may have access to secure element B). In some embodiments, the key may only be obtained by accessing the secure element.

At block 420, a file system may be prepared. In some embodiments, the OS virtualization secure volume plugin 214 may obtain the key from the data management engine 210 or secure element and a passphrase from the user and/or request from block 405. The OS virtualization secure volume plugin 214 may prepare a secure file system 218 for a virtualized secure volume instance 216 of a container instance 224. In some embodiments, the OS virtualization secure volume plugin 214 may prepare the secure file system 218 for a specified mount point using a user provided passphrase and obtained key (e.g., applying two-factor encryption to the secure file system 218). In some embodiments, the OS virtualization secure volume plugin 214 may determine that the secure volume instance 216 is an encrypted virtual disk image, which may be encrypted using Linux Unified Key Setup (LUKS) or similar technique. In some embodiments, the OS virtualization secure volume plugin 214 may determine that the secure volume instance 216 is an encrypted directory, which may be encrypted using Enterprise Cryptographic Filesystem (eCryptfs) or similar technique.

At block 425, the file system 218 may be initiated. In some embodiments, an OS virtualization engine 212 may execute a command to initiate the container instance 224 that includes the secure volume instance 216 that includes the secure file system 218. In some embodiments, the command may include specified mount points and volume plugins to initiate the container instance 224 including the secure volume instance 216. In some embodiments, the application 220 may access artifacts in the secure file system 218 as plaintext files from within the container instance 224, not knowing that the underlying file systems are secured by encryption. Thus, the application 220 does not have to implement any additional cryptologic.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a request for a virtualized application container;
   obtaining, via a user device, a passphrase from a user;
   obtaining a key from a key management server using a universal unique identifier (UUID), wherein the UUID corresponds to the passphrase from the user;
   preparing a file system of the virtualized application container for a specified mount point determined based on the passphrase and the key, wherein the specified mount point determines which applications and plugins are available in the virtualized application container; and
   initiating the file system in response to the request,
   wherein preparing the file system includes encrypting the file system is based on the UUID.

2. The computer-implemented method of claim 1, wherein the file system of the virtualized application container is associated with an encrypted virtual disk image.

3. The computer-implemented method of claim 1, wherein the file system of the virtualized application container is associated with an encrypted directory.

4. The computer-implemented method of claim 1, wherein preparing the file system further comprises:
   applying a two-factor encryption to the file system using the passphrase and the key.

5. The computer-implemented method of claim 1, wherein the key is stored on a secure element of a host device which is separate from a central processing unit of the host device.

6. A computer program product comprising a non-transitory storage medium readable by a processing circuit and storing instructions for execution by the processing circuit for performing a method comprising:
   receiving a request for a virtualized application container;
   obtaining, via a user device, a passphrase from a user;
   obtaining a key from a key management server using a universal unique identifier (UUID), wherein the UUID corresponds to the passphrase from the user;
   preparing a file system of the virtualized application container for a specified mount point determined based on the passphrase and the key, wherein the specified mount point determines which applications and plugins are available in the virtualized application container; and
   initiating the file system in response to the request,
   wherein preparing the file system includes encrypting the file system is based on the UUID.

7. The computer program product of claim 6, wherein the file system of the virtualized application container is associated with an encrypted virtual disk image.

8. The computer program product of claim 6, wherein the file system of the virtualized application container is associated with an encrypted directory.

9. The computer program product of claim 6, wherein preparing the file system further comprises:
   applying a two-factor encryption to the file system using the passphrase and the key.

10. A system, comprising:
    a hardware processor in communication with one or more types of memory, the processor configured to:
    receive a request for a virtualized application container;
    obtain, via a user device, a passphrase from a user;
    obtain a key from a key management server using a universal unique identifier (UUID), wherein the UUID corresponds to the passphrase from the user;
    prepare a file system of the virtualized application container for a specified mount point determined based on the passphrase and the key, wherein the specified mount point determines which applications and plugins are available in the virtualized application container; and
    initiate the file system in response to the request,
    wherein preparing the file system includes encrypting the file system is based on the UUID.

11. The system of claim 10, wherein the file system of the virtualized application container is associated with an encrypted virtual disk image.

12. The system of claim 10, wherein the file system of the virtualized application container is associated with an encrypted directory.

13. The system of claim 10, wherein, to prepare the file system, the processor is further configured to:
    apply a two-factor encryption to the file system using the passphrase and the key.

* * * * *